R. D. MOSSMAN.
Machine for Making Wood-Pulp for Paper.
No. 8,698. Reissued May 6, 1879.
Fig: 1.
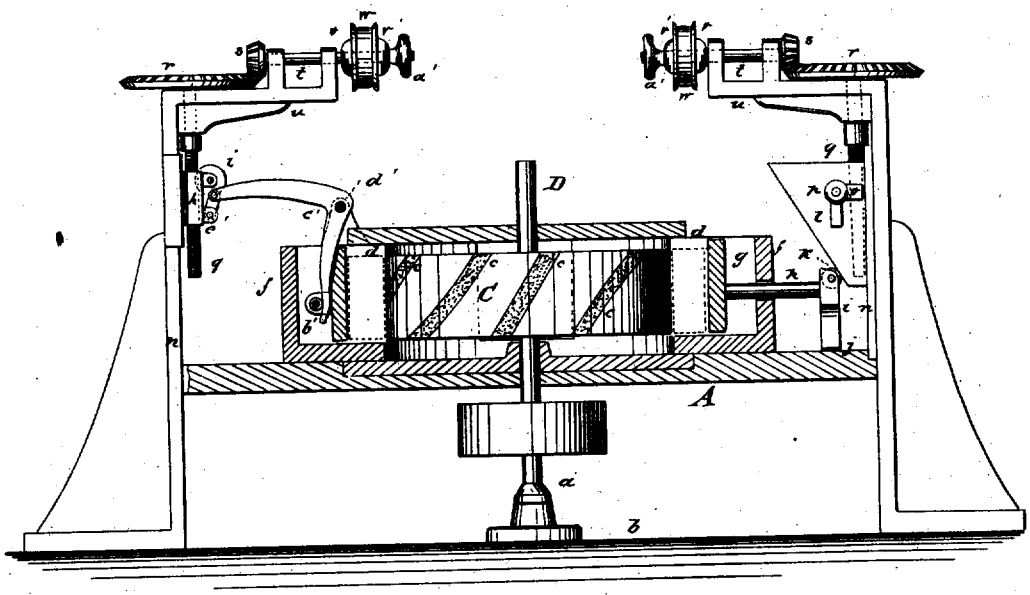
Fig: 3
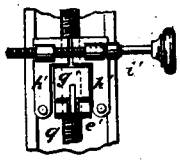
Fig: 4.
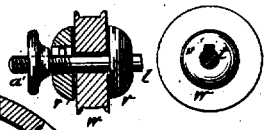
Fig: 5.
Fig: 2
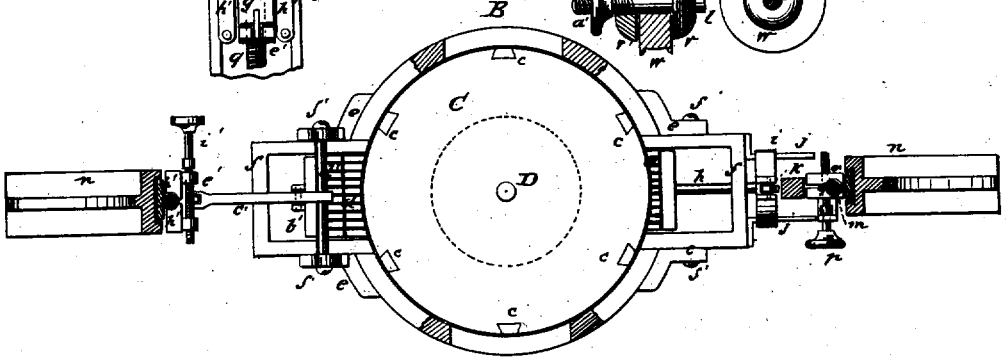
WITNESSES:
C. Sedgwick
J. H. Henley
INVENTOR:
R. D. Mossman
BY Munn & Co
ATTORNEYS.
N. PETERS, PHOTO-LITHOGRAPHER, WASHINGTON, D. C.

UNITED STATES PATENT OFFICE.

ROBERT D. MOSSMAN, OF BRISTOL, NEW HAMPSHIRE.

IMPROVEMENT IN MACHINES FOR MAKING WOOD-PULP FOR PAPER.

Specification forming part of Letters Patent No. 202,185, dated April 9, 1878; Reissue No. 8,698, dated May 6, 1879; application filed February 26, 1879.

*To all whom it may concern:*

Be it known that I, ROBERT D. MOSSMAN, of Bristol, in the county of Grafton and State of New Hampshire, have invented a new and useful Improvement in Machines for Making Wood-Pulp for Paper, of which the following is a specification.

Figure 1 is a side elevation, partly in section, of my improved machine. Fig. 2 is a plan view, partly in section. Fig. 3 is a detail view of one of the shear-nuts. Figs. 4 and 5 are detail views of the friction-wheels.

Similar letters of reference indicate corresponding parts.

My invention relates to the class of machines employed in the manufacture of paper-pulp from blocks of wood; and it consists in a grindstone in whose face there are corundum-filled diagonal grooves, said stone being mounted on a vertical shaft and inclosed in a curb, in diametrically-opposite sides of which there are adjustable pockets for containing the wooden blocks from which the pulp is made.

It also consists in a variable feeding device, which will press the blocks against the stone with more or less force.

Referring to the drawings, A is a platform, upon which is secured a curb, B, that is made in sections, which are bolted together and to the platform. In this curb is placed a grindstone, C, that is carried by the vertical shaft D, which is journaled in boxes at the top of the curb, and rests on a step, *a*, on the foundation *b*.

The periphery of the stone C is traversed diagonally by dovetail grooves *c*, which are filled with a corundum paste. The number and distance apart of the diagonal corundum-filled grooves may vary with the quality and size of the stone.

In opposite sides of the curb B there are rectangular apertures *d*, at the sides of which ears *e* project from the curb. Between these ears, and in the rectangular apertures *d*, pockets *f* are placed. Screws *f'* project through slots in the ears *e*, and enter the sides of the pockets, for clamping them in position. In each pocket a follower is placed, which is pressed forward, so as to force the wood which is placed in the pockets against the periphery of the stone.

The follower *g* in one of the pockets is provided with a rod, *h*, that extends through the outer wall of the pocket, and is provided with a head, *i*, which rests upon ways *j*, that project from the platform A, and carries a roller, *k*, that is engaged by a wedge, *l*, sliding in ways in the standard *n*. The said wedge is provided with a shear-nut, *o*, which is placed in a mortise in the wedge, and is opened and closed by means of a screw, *p*.

A vertical screw, *q*, is journaled in the standard *n*, and passes through the shear-nut *o*. A bevel-wheel, *r*, is secured to the upper end of the screw, and is driven by a bevel-pinion, *s*, on the shaft *t*, which is journaled in a bracket, *u*, that projects from the standard *n* over the curb B.

Upon the inner end of the shaft *t* a fixed collar, *v*, and a loose collar, *v'*, are placed. The loose collar is prevented from turning by a feather in the shaft and a slot in the collar. Between these two collars is placed a pulley, *w*, whose sides are clamped with more or less force between the collars by means of a nut, *a'*, placed on the extreme end of the shaft.

A belt running on the pulley *w* rotates the screw *q* and carries down the wedge *l*, so that the follower *g* is carried forward, pressing the wooden block against the stone with more or less force.

The feed may be varied by changing the pressure on the pulley *w*.

Upon the opposite side of the curb a follower, *b'*, is placed in the pocket *f*, and moved forward by a right-angled lever, *c'*, which is secured to a shaft, *d'*, that is journaled in short standards that project upward from the ears *e*. This lever is connected with a shear-nut, *e'*, on the screw *q*, which is supported and driven in the same manner as the screw *q* on the opposite side of the machine.

The shear-nut *e'* consists of a block, *g'*, to which are pivoted the two halves *h' h'* of the nut. A screw, *i'*, passes through an ear that projects from one of the halves of the nut, and is received by an apertured and internally-threaded ear projecting from the other half of the nut.

By unscrewing the screw *i'* the shear-nut *e'* is disengaged from the screw *q*, and the follower *b'* may be retracted. As the stone wears away, the pockets *f* may be moved up after loosening the screws *f'*.

The wood to be reduced to pulp is placed in the pockets *f*, and is pressed against the periphery of the stone by the means already described. The stone is rotated by connection with any suitable motor, and water is poured on the wood in the pockets.

The wood is cut into blocks of a size adapted for insertion in the pockets, and the pockets are filled with the block. The blocks are placed in such position that the grain of the wood runs in a line diagonal to the direction of the corundum-grooves *c*, as illustrated by Fig. 6, in which figure the direction of the diagonal grooves is shown by arrows.

The action of the corundum is to roughen the wood by cutting across the fibers and raising the cut ends by an undercutting action, due to the diagonal position of the grooves *c*. The smoother surface of the stone removes the fibers raised by the corundum.

The length and fineness of the pulp or fiber removed from the stone will be dependent upon the grade of corundum used in the grooves and the pressure exerted upon the wood by the followers.

The wood being pressed upon diametrically-opposite sides of the stone relieves the shaft D from lateral pressure.

The pulp removed from the wood is thrown by centrifugal force against the inner surface of the curb, whence it falls to the bottom, and runs through a suitable sluice to a vat. The pulp removed at each pocket is discharged directly without passing to a second pocket, as has been heretofore done, and regrinding of the pulp is avoided. This regrinding is a fruitful source of uneven pulp discoloration, and other objectionable features in the art of reducing wood to pulp, and by constructing my machine with the detached pockets, as shown, the quality of the pulp is improved.

It will be seen that the manufacture of wood-pulp by the above-described machine involves a process such as has not been made use of heretofore.

Having thus described my invention, I claim as new and desire to secure by Letters Patent—

1. A grindstone having corundum-filled grooves in its periphery, as and for the purposes specified.

2. The pockets of a wood-pulping machine arranged directly opposite each other on the outside of curb, and pressing toward the center, in combination with a four-section curb, whose sections fit severally between the pockets, and are provided with ears, as shown and described.

3. The screw *q*, wedge *l*, having the shear-nut *o*, and the follower *g*, having the rod *h* and head *i*, in combination, substantially as herein shown and described.

4. In a wood-pulping machine, fixed collar *v*, movable collar *v'*, nut *a'*, pulley *w*, and shaft *t*, in combination, substantially as herein shown and described.

5. The combination of the right-angled lever *c'*, shear-nut *h'*, screw *q*, and follower *b'*, as herein shown and described.

6. The stone formed with narrow grooves filled with emery, whereby the wood is first roughed up and then rubbed off, thus making a very fine and strong pulp.

7. In a wood-pulping machine, the combination, with the grindstone, of detached pockets for containing the wood, whereby the pulp is separately delivered from each pocket without regrinding, as specified.

8. The improved process of pulping wood, consisting in removing the fibers from the block by a grinding-surface that first cuts or roughs up the fibers by sharp cutting-edges, and then brushes or rubs them off by a smoother surface, substantially as specified.

9. The improved process of pulping wood, consisting in first cutting and roughing up the fibers by a stone having-cutting edges that act in a direction diagonal to the grain of the wood, and removing the cut fibers by a rubbing action of the smoother portions of the stone, substantially as specified.

10. The improved process of pulping wood, which consists in first cutting and roughing up the fibers by a stone that cuts across the fibers in a direction diagonal to the grain, and in a circle concentric with the stone, and then removes the cut fibers by a rubbing action of a smoother surface, substantially as specified.

ROBERT D. MOSSMAN.

Witnesses:
B. F. PERKINS,
GUSTAVUS ROBY.